(12) United States Patent
Gopalan et al.

(10) Patent No.: US 11,636,244 B1
(45) Date of Patent: Apr. 25, 2023

(54) PERFORMANCE TUNING OF A HARDWARE DESCRIPTION LANGUAGE SIMULATOR

(71) Applicant: Synopsys, Inc., Mountain View, CA (US)

(72) Inventors: Badri Prasad Gopalan, Cupertino, CA (US); Melvin Cardozo, San Jose, CA (US); Deepesh Puthiya-Purayil, Dublin, CA (US); Vamsi Krishna Doppalapudi, Hyberabad (IN); Trinanjan Chatterjee, Bangalore (IN); Yichun Wang, Shanghai (CN)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 17/490,897

(22) Filed: Sep. 30, 2021

Related U.S. Application Data

(60) Provisional application No. 63/085,780, filed on Sep. 30, 2020.

(51) Int. Cl.
*G06F 30/30* (2020.01)
*G06F 30/27* (2020.01)
*G06F 30/327* (2020.01)
*G06F 30/3308* (2020.01)

(52) U.S. Cl.
CPC .......... *G06F 30/327* (2020.01); *G06F 30/27* (2020.01); *G06F 30/3308* (2020.01)

(58) Field of Classification Search
None
See application file for complete search history.

(56) References Cited

U.S. PATENT DOCUMENTS

| | | | | |
|---|---|---|---|---|
| 7,467,364 | B2 * | 12/2008 | Hekmatpour | G01R 31/31835 716/106 |
| 10,078,717 | B1 * | 9/2018 | Venkataramani | G06F 30/327 |
| 10,546,080 | B1 * | 1/2020 | Ashkenazi | G06F 30/33 |
| 10,831,961 | B2 * | 11/2020 | Dutta | G06F 30/398 |
| 10,867,098 | B1 * | 12/2020 | Ting | G06N 3/105 |
| 11,467,851 | B1 * | 10/2022 | De | G06F 30/20 |

* cited by examiner

*Primary Examiner* — Leigh M Garbowski
(74) *Attorney, Agent, or Firm* — Lewis Roca Rothgerber Christie LLP

(57) ABSTRACT

Some aspects of this disclosure are directed automated performance tuning of a hardware description language (HDL) simulation system. For example, some aspects of this disclosure relate to a method, including generating, by a first subsystem optimizer, a plurality of recommendations corresponding to a first subsystem of a hardware description language (HDL) simulation system. The plurality of recommendations are generated by the first subsystem optimizer using one or more optimization applications. The method further includes generating, by the first subsystem optimizer, a first aggregate recommendation by combining the plurality of recommendations corresponding to the first subsystem of the HDL simulation system. The method further includes updating a configuration of the first subsystem of the HDL simulation system based on the first aggregate recommendation, wherein the HDL simulation system is configured to simulate a circuit design using the updated configuration during execution of the first subsystem.

19 Claims, 8 Drawing Sheets

PERFORMANCE TUNING OF A HARDWARE DESCRIPTION LANGUAGE SIMULATOR

RELATED APPLICATION

This application claims the benefit of U.S. Provisional Patent Appl. No. 63/085,780 filed Sep. 30, 2020, and entitled "AUTOMATED META-HEURISTIC PERFORMANCE TUNING OF A HDL SIMULATOR USING AI, MACHINE LEARNING TECHNIQUES," and is incorporated herein in its entirety.

TECHNICAL FIELD

The present disclosure generally relates to an electronic design automation (EDA) system. In particular, the present disclosure relates to automated meta-heuristic performance tuning of a hardware description language (HDL) simulator.

BACKGROUND

Circuit simulation is a process in which a model of an electronic circuit is created and analyzed using various instructions performed by a process, which predict and verify the behavior and performance of the circuit. Since the fabrication of electronic circuits, especially integrated circuits (ICs), is expensive and time-consuming, it is faster and more cost-effective to verify the behavior and performance of the circuit using a circuit simulator before fabrication.

In EDA, a simulation system receives a description of a proposed circuit and simulate its behavior before it is implemented. This description is typically presented in a HDL such as Verilog or VHDL. Simulation systems, such as an HDL simulator, model the behavior of circuit elements at various degrees of detail and perform various operations to simulate the resultant behavior of the circuit.

SUMMARY

Some aspects of this disclosure relate to a method for implementing automated meta-heuristic performance tuning of an HDL simulation system. For example, some aspects of this disclosure relate to a method, including generating, by a first subsystem optimizer, a plurality of recommendations corresponding to a first subsystem of an HDL simulation system. The plurality of recommendations are generated by the first subsystem optimizer using one or more optimization applications. According to some aspects, the method further includes generating, by the first subsystem optimizer, a first aggregate recommendation by combining the plurality of recommendations corresponding to the first subsystem of the HDL simulation system. According to some aspects, the method further includes updating a configuration of the first subsystem of the HDL simulation system based on the first aggregate recommendation, where the HDL simulation system is configured to simulate a circuit design using the updated configuration during execution of the first subsystem.

Some aspects of this disclosure relate to the method that further includes generating, by a second subsystem optimizer, a second aggregate recommendation by combining a plurality of recommendations corresponding to a second subsystem, where the plurality recommendations corresponding to the second subsystem are generated by the second subsystem optimizer using one or more optimization applications. According to some aspects, the method further includes combining, using a gating model, the first aggregate recommendation, the second recommendation, and a user input to generate a gating-mixture recommendation, where updating the configuration of the first subsystem of the HDL simulation system includes updating a configuration of the HDL simulation system based on the gating-mixture recommendation.

According to some aspects of this disclosure relating to the method, the combining is performed by the gated model using a random forest machine learning process. According to some aspects, an optimization application of the one or more optimization applications is based on a weak learner process. According to some aspects, an optimization application of the one or more optimization applications is based on a machine learning (ML) process. According to some aspects, an optimization application of the one or more optimization applications is based on a rule-based model. According to some aspects, the one or more recommendations corresponding to the first subsystem are combined using a weighted averaging. According to some aspects, the one or more recommendations are generated based on data related to one or more of test-bench constructs, design constructs, coverage constructs, assertion constructs, low power constructs, compile statistics, runtime statistics, switches, profiles, and simulation system heuristics. According to some aspects, the updated configuration includes a specified set of computing resources for the HDL simulation system.

Some aspects of this disclosure relate to a system for implementing automated meta-heuristic performance tuning of an HDL simulation system. For example, some aspects of this disclosure relate to a memory storing instructions, and a processor, coupled with the memory and to execute the instructions. According to some aspects, the instructions when executed, cause the processor to generate a plurality of recommendations corresponding to a first subsystem of an HDL simulation system using one or more optimization applications. According to some aspects, the instructions when executed, further cause the processor to generate a first aggregate recommendation by combining the plurality of recommendations corresponding to the first subsystem of the HDL simulation system. According to some aspects, the instructions when executed, further cause the processor to update a configuration of the first subsystem of the HDL simulation system based on the first aggregate recommendation, where the HDL simulation system is configured to simulate a circuit design using the updated configuration during execution of the first subsystem.

According to some aspects, the instructions when executed, further cause the processor to generate a second aggregate recommendation by combining a plurality of recommendations corresponding to a second subsystem, where the plurality of recommendations corresponding to the second subsystem are generated using one or more optimization applications. According to some aspects, the instructions when executed, further cause the processor to combine the first aggregate recommendation, the second recommendation, and a user input to generate a gating-mixture recommendation, where updating the configuration of the first subsystem of the HDL simulation system includes updating a configuration of the HDL simulation system based on the gating-mixture recommendation.

Some aspects of this disclosure relate to a non-transitory computer readable medium, including stored instructions, which, when executed by a processor, cause the processor to generate a plurality of recommendations corresponding to a first subsystem of an HDL simulation system. The plurality of recommendations are generated using one or more optimization applications. According to some aspects, the instructions further cause the processor to generate a first aggregate recommendation by combining the plurality of recommendations corresponding to the first subsystem of the HDL simulation system. According to some aspects, the instructions further cause the processor to update a configuration of the first subsystem of the HDL simulation system based on the first aggregate recommendation, where the HDL simulation system is configured to simulate a circuit design using the updated configuration during execution of the first subsystem.

According to some aspects, the instructions further cause the processor to generate a second aggregate recommendation by combining a plurality of recommendations corresponding to a second subsystem, where the plurality of recommendations corresponding to the second subsystem are generated using one or more optimization applications. According to some aspects, the instructions further cause the processor to combine the first aggregate recommendation, the second recommendation, and a user input to generate a gating-mixture recommendation, where updating the configuration of the first subsystem of the HDL simulation system includes updating a configuration of the HDL simulation system based on the gating-mixture recommendation.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
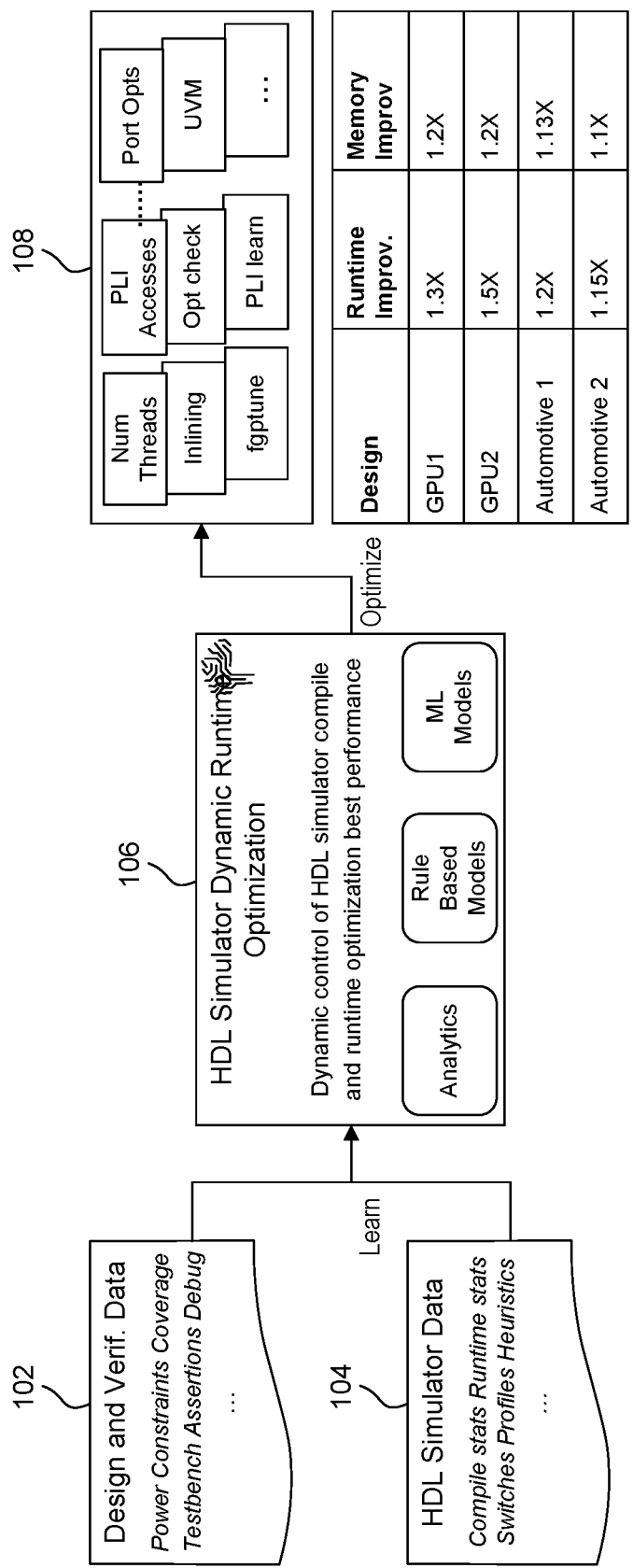
FIG. 1 illustrates a high-level diagram of a system that enables automated performance tuning of an HDL simulator, according to some aspects.

Aspects of the present disclosure relate to automated meta-heuristic performance tuning of an HDL simulator.

HDL simulator performance tuning is currently a time-intensive activity, but a valuable activity to carry out nonetheless. Performance tuning an HDL simulator is typically time-intensive because expert knowledge of the simulator, and the design and test for which it is applied, is needed in order to carry out the tuning. But if properly tuned, the effort is valuable to the end-user because HDL simulation is the workhorse of digital verification and utilizes a lot of hardware resources.

Optimizing the performance of the simulation system is an important goal towards completing the simulation of the proposed circuit in a defined cost and time budget. A simulation system comprises multiple subsystems, and the performance of the simulation subsystem is a complex combination of the various sub-systems which comprise it. According to some aspects, an HDL compile and simulation can be optimized by identifying the base options or hardware configuration for the design being tested. According to some aspects, an automated agent solves this problem using data collection and analytics or AI and ML techniques in an automated manner. Performance tuning via optimization can provide an improvement in end-to-end throughput, latency, or cost of the simulation process.

As a result, the problem of needing specialized expertise to manually tune HDL simulations, such that scaling manual performance tuning would require expert knowledge deployed at every possible customer and analyzing every possible design and test continuously, can be solved by automated performance tuning approaches disclosed herein. Automated performance tuning can remove the need for an expert to be involved and can be performed at scale at the user premises without manual intervention. An improvement in the simulation performance or hardware configuration can result in considerable cost savings or time to market for the end-user.

According to some aspects, automated performance tuning of HDL simulation may involve automatic data collection, building a performance tuning agent, and applying recommendations from the performance tuning agent in an automated manner. Data collection may include identifying design features and applicable detailed profiles and statistics. Further, building a performance tuning agent may include building a set of optimization applications that are trained to use the data collected to make recommendations on simulation options, simulation heuristics, or hardware infrastructure on which the simulation runs.

Advantages of the present disclosure include, but are not limited to, automated tuning for a complex HDL simulator system in an automated manner, starting from a strong baseline due to the factory trained model, adapting to design-specific traits affecting simulation by incorporation of on-site data collection, and combination with the factory-trained model as a weak learner.

FIG. 1 illustrates a high-level diagram of a system that enables automated performance tuning of an HDL simulator, according to some aspects. According to some aspects, design and verification data 102 and HDL simulator data 104 are collected during a learning phase of the performance tuning system. According to some aspects, design and verification data 102 may include the existence and volume of specific testbench constructs, design constructs, coverage constructs, assertion constructs, and low power constructs. According to some aspects, HDL simulator data 104 may include compile statistics, runtime statistics, and information regarding switches, profiles, and heuristics. The collected data is input to HDL simulator dynamic runtime optimization module 106. Based on the input data, HDL simulator dynamic runtime optimization module 106 generates one or more optimization recommendations 108 that may result in improved performance of the HDL simulator. According to some aspects, an HDL simulation system may include one or more processors configured to execute the HDL simulator, such as in the example computer system of FIG. 8 discussed further below.

According to some aspects, the data collected during the training phase includes design and verification data 102 and HDL simulator data 104. Data collection may include automatically identifying and collecting profiles and design and test statistics. Further, the collected data may include, at a high level, any kind of relevant data about the design and testbench or tests which can be used to make performance decisions on the kind of options to be used. For example, design and verification data 102 may include the existence and volume of specific testbench constructs, design constructs, coverage constructs, assertion constructs, and low power constructs. Further, HDL simulator data 104 may include compile statistics, runtime statistics, and information regarding switches, profiles, and heuristics.

According to some aspects, HDL simulator dynamic runtime optimization module 106 may perform optimization using one or more optimization applications. Each optimization application may use one or more optimization processes. Further, an optimization application may focus on performing optimization of one or more specific aspects of an HDL simulator. According to some aspects, an optimization application may use a rule-based (expert) system or a machine learning model to predict the applicability of an optimization and the performance gain expected out of an optimization for a design with those specific characteristics.

Figure 8:
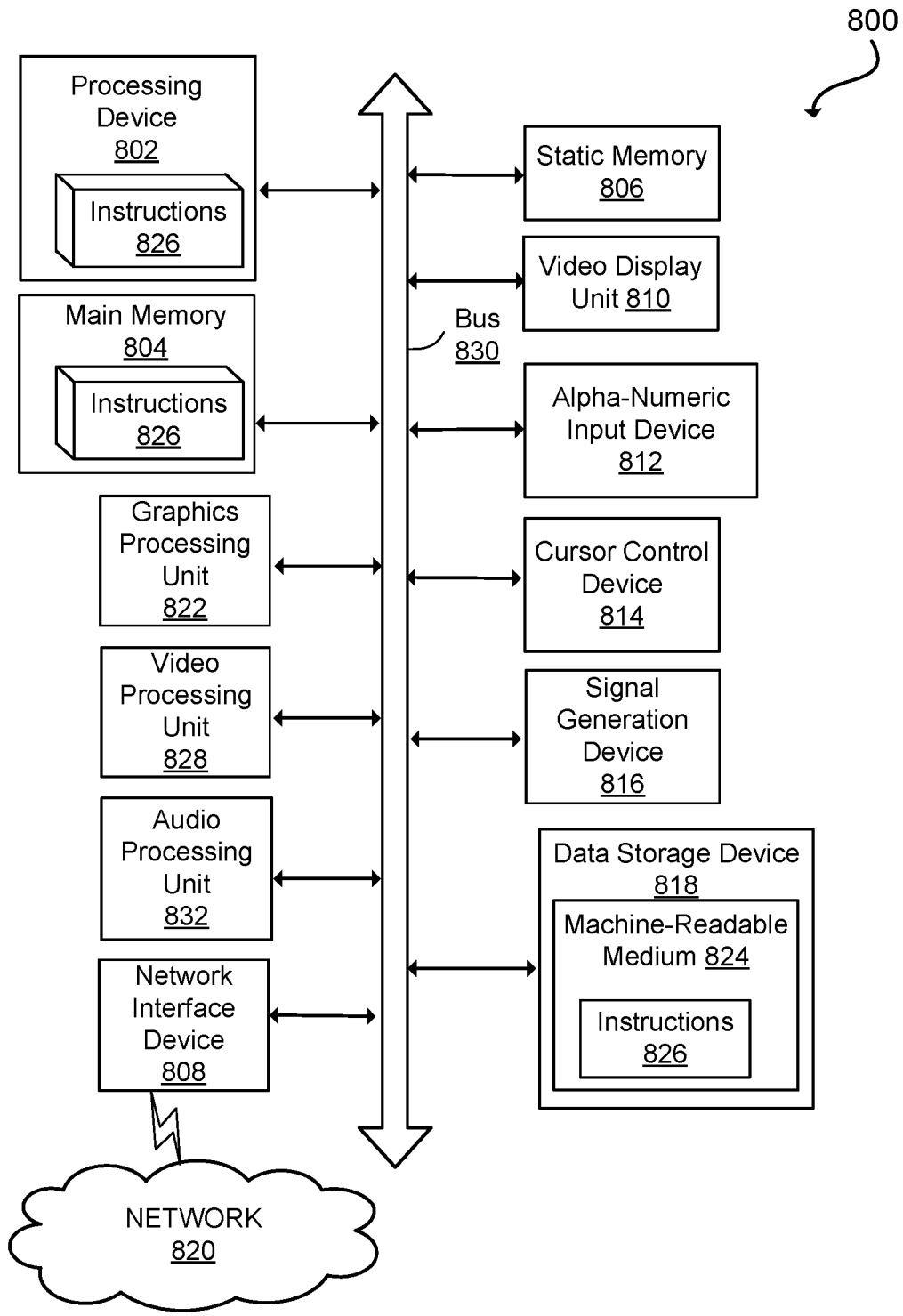
FIG. 8 depicts a diagram of an example computer system in which embodiments of the present disclosure may operate.

According to some aspects, HDL simulator dynamic runtime optimization module 106 can include one or more subsystem optimizers. Each subsystem optimizer uses one or more optimization applications to optimize parameters corresponding to a particular subsystem of the HDL simulator. According to some aspects, an HDL simulation system may include one or more processors, such as in the example computer system of FIG. 8, that are configured to execute the HDL simulator dynamic runtime optimization module 106 and one or more subsystem optimizers that are included in the HDL simulator dynamic runtime optimization module 106. The example computer system of FIG. 8 is discussed further below. As a non-limiting example, a thread number subsystem optimizer uses one or more optimization applications to optimize the number of threads employed by the HDL simulator. As another non-limiting example, a programming language interface (PLI) subsystem optimizer uses one or more optimization applications to optimize the PLI subsystem of the HDL simulator. Further, according to some aspects, the outputs of the subsystem optimizers can be combined using a gating function to generate an improved recommendation for performance tuning the HDL simulator.

According to some aspects, an optimization application of the HDL simulator dynamic optimization module 106 may generate performance recommendations using compile-time information, or runtime information from previous runs, or a combination of both. According to some aspects, an optimization application may provide a choice of objective functions to optimize. Examples of objective functions include minimization of compile-time, run-time, or balanced turnaround time. Further, some optimization applications may specifically perform optimization based on one or more objective functions.

According to some aspects, an optimization application may be designed to optimize a complete set of regression tests which is a set of compilations and runs, and may run with a combination of HDL simulator options, alternative tools or feature recommendations. An example recommendation may include a version of a design module such as an IP block from a third party. According to some aspects, an optimization application may provide infrastructure recommendations, such as recommending a faster or cheaper hardware configuration.

According to some aspects, an optimization application of the HDL simulator dynamic optimization module 106 provides simulation option tuning based on reinforcement learning using an objective function of simulation time, memory, compile time, memory, or a combination of these objective functions. The tuning utility learns by simulating various combinations of options intelligently over several trail runs. According to some aspects, an optimization application may be implemented using a pre-trained or offline-trained model that can predict performance. According to some aspects, an optimization application may implement data collection to facilitate the transfer of data in order to improve the pre-trained or off-line trained models. According to some aspects, an optimization application may be implemented using an online training algorithm which may use data available from a user to customize further or improve recommendations provided to that user.

According to some aspects, HDL simulator dynamic runtime optimization module 106 generates one or more optimization recommendations 108 using the collected data and the one or more optimization applications. The generated optimization recommendations 108 may include optimal simulation parameters, options or optimal configuration of computing and storage hardware. Examples of optimization recommendations may include optimal processor thread numbers, PLI accesses parameters, processor thread options, simulator inlining parameters, simulator option checks, universal verification methodology (UVM) features, fined grain parallelism (FGP) tuning parameters, and PLI learn parameters.

Figure 2:
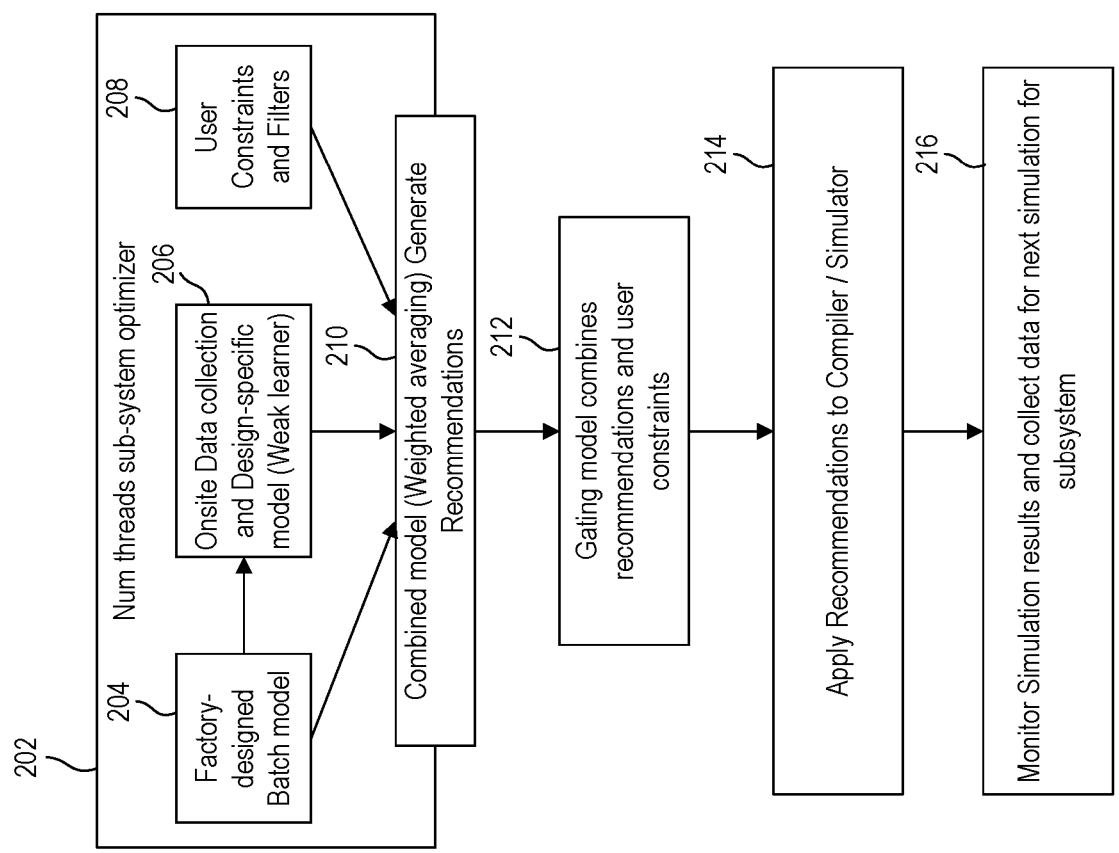
FIG. 2 illustrates an exemplary performance tuning of a subsystem of an HDL simulator using a subsystem optimizer.

FIG. 2 illustrates an exemplary performance tuning of a subsystem of an HDL simulator using a subsystem optimizer. A number of threads subsystem optimizer 202 uses one or more optimization applications to generate recommendations corresponding to an optimal number of threads employed by the HDL simulator. According to some aspects, the number of threads subsystem optimizer 202 is a component of HDL simulator dynamic runtime optimization module 106. According to some aspects, optimization module 106 includes multiple subsystem optimizers such as 202. In this example, factory-designed batch model 204 is a rule-based or machine-learning based optimization application created at the developer organization (factory) based on a dataset available at the software development organization (factory), and potentially subjected to biases of the data at the factory. According to some aspects, a factory-trained optimization model can be further trained using data collected by performing simulations over a factory benchmark HDL simulator. Further, factory-designed batch model 204 may be based on a rule-based optimization model with subsystem-specific rules written by expert developers or feature experts.

According to some aspects, the onsite data collection and design-specific model 206 in FIG. 2 is an optimization application that generates optimization recommendations based on a machine learning algorithm with data collected at the user site with features defined by feature experts. According to some aspects, the onsite data collection and design-specific model 206 uses the simulations results from previous simulations and as training data. Onsite training of an optimization application based on data from previous simulations may be considered as part of a set of weak learners, according to some aspects. According to some aspects, design-specific model 206 can be trained onsite based on the onsite data collection and considered as a weak learner to be combined with the optimization recommendations generated by factory-designed batch model.

According to some aspects, the onsite data collection and design-specific model 206 uses a weak learner algorithm that is a sub-optimal ML algorithm. According to some aspects, a weak learner algorithm can be based on a decision stump or a one-level decision tree that uses a threshold for a specific feature of the subsystem. According to some aspects, one or more optimization applications that employ weak learning algorithms can be combined using a boosting algorithm to produce a strong learner that generates improved recommendations for performance tuning an HDL simulator.

According to some aspects, the user constraints and filters module 208 provides user inputs or recommendations related to an optimal number of threads or other boundary conditions stipulated by the user to be employed by the HDL simulator. The user-specific inputs can be related to a specific subsystem of the HDL simulator, such as the number of threads or processor cores employed by the HDL simulator. As a non-limiting example, user input may specify using a maximum of 2 processor cores of the HDL simulator.

At 210, recommendations from the outputs of factory-designed batch model 204, the design specific model with onsite data collection 206, and user constraints and filters module 208 are combined to generate an aggregate recommendation corresponding to the number of threads subsystem of the HDL simulator. According to some aspects, an aggregate recommendation can be generated by combining the recommendations using a weighted averaging. According to some aspects, the set of weights for the weighted averaging can be calculated iteratively based on simulation data from previous simulations. According to some aspects, the set of weights for the weighted averaging can be calculated by optimizing the synaptic weights of a corresponding neural network model. According to some aspects, an aggregate recommendation can be generated by combining the recommendations using an ensemble averaging process. According to some aspects, in machine learning, ensemble averaging is the process of creating multiple models and combining them to produce a desired output, as opposed to creating just one model. According to some aspects, combining the recommendations from the outputs of factory-designed batch model 204, the design specific model with onsite data collection 206, and user constraints and filters module 208 to using an ensemble averaging process averages out the errors of the individual models and generates an aggregate recommendation that is better than any individual model.

According to some aspects, aggregate recommendations from multiple subsystem optimizers can be combined using a gating function to generate an improved gating-mixture recommendation for performance tuning the HDL simulator. A gating function is a function which blocks or combines the various recommendations based on user constraints, rules, or based on learning which model provides better recommendations based on new on-site data. At 212, a gating function combines aggregate recommendations from sub-system optimizers and user-specified constraints and rules to generate an aggregate gating-mixture recommendation. At 214, the aggregate gating-mixture recommendation is applied to update a configuration of the HDL simulator and compiler. The updated configuration include command line and configuration file-based parameters tuned to optimize the performance of the HDL simulator and compiler. At 216, the HDL simulator and compiler perform a simulation of a circuit design that is under test using the updated configuration. The simulation results are monitored to quantify the performance of the simulator and compiler based on the model recommendations. According to some aspects, the simulation results and the metadata generated during the simulation process are collected. According to some aspects, the collected simulation results and metadata are used during a learning phase as inputs to one or more optimization algorithms used by the subsystem optimizers.

Figure 3:
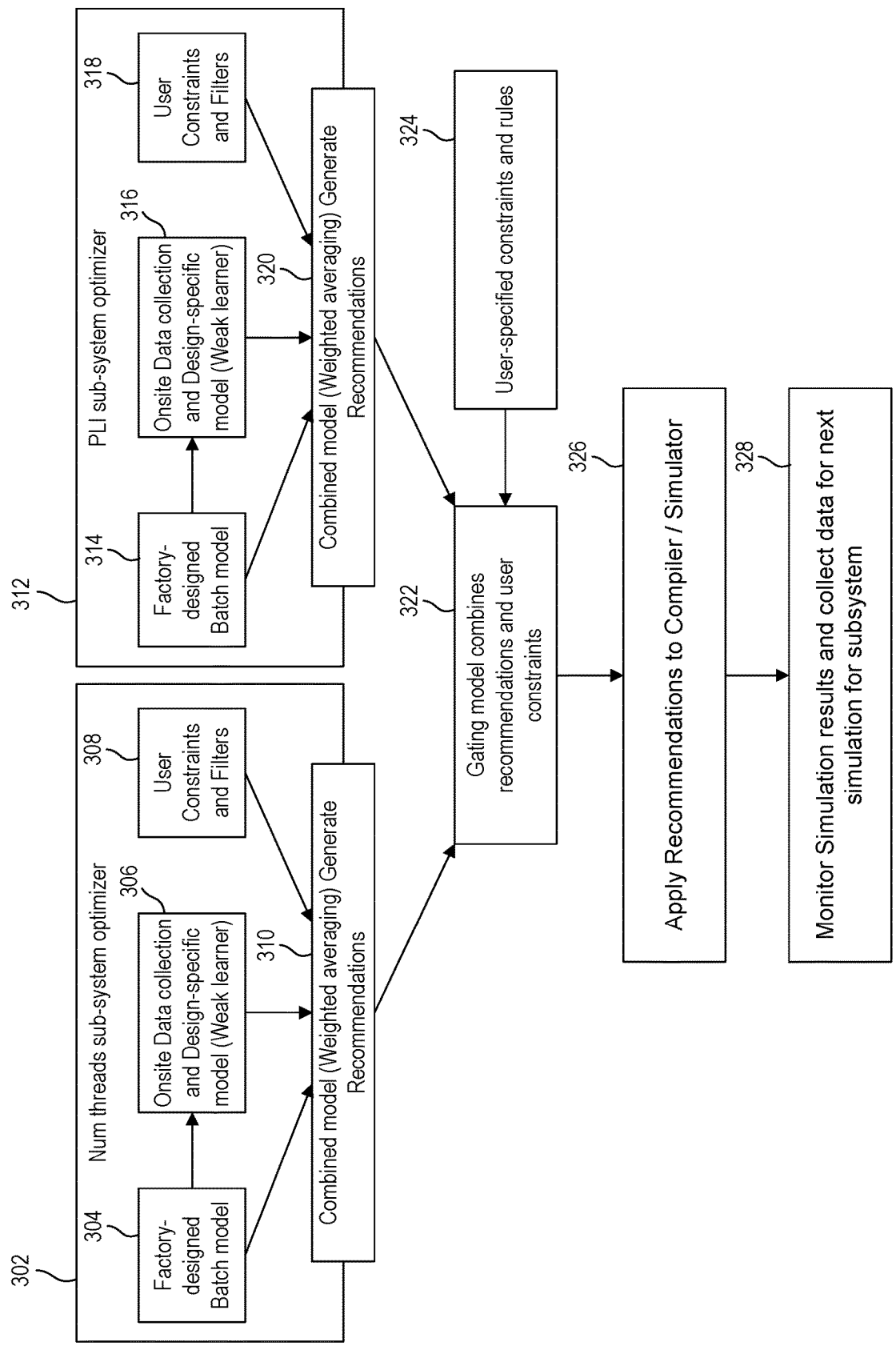
FIG. 3 illustrates an exemplary combining of aggregate recommendations from multiple performance subsystem optimizers using a gating model to generate a gating-mixture recommendation.

FIG. 3 illustrates an exemplary combining of aggregate recommendations from multiple performance subsystem optimizers of a HDL simulation system using a gating function to generate a gating-mixture recommendation. The number of threads subsystem optimizer 302 generates an aggregate recommendation corresponding to an optimal number of threads and processor cores that are to be used by the HDL simulator, as described above with reference to FIG. 2.

Programming language interface (PLI) subsystem optimizer 312 uses one or more optimization applications to generate recommendations corresponding to one or more parameters of a PLI subsystem of the HDL simulation system. According to some aspects, the PLI subsystem optimizer 312 is a component of HDL simulator dynamic runtime optimization module 106. According to some aspects, optimization module 106 includes multiple subsystem optimizers such as 320 and 312. According to some aspects, factory-designed batch model 314 is an optimization application that generates optimization recommendations based on a factory-trained optimization model, similar to 204 in FIG. 2. According to some aspects, onsite data collection and design-specific model 316 is an optimization application that generates optimization recommendations based on a weak learner algorithm, similar to 206 in FIG. 2. According to some aspects, the user constraints and filters module 318 provides user inputs or recommendations related to the PLI subsystem employed by the HDL simulator. At 320, the outputs of factory-designed batch model 314, the design specific model with onsite data collection 316, and user constraints and filters module 318 are combined to generate an aggregate recommendation corresponding to the number of threads subsystem of the HDL simulator. According to some aspects, an aggregate recommendation can be generated by combining the recommendations using a weighted averaging.

According to some aspects, aggregate recommendations from multiple subsystem optimizers can be combined using a gating function to generate an improved gating-mixture recommendation for performance tuning the HDL simulator. At 322, a gating model combines the aggregate recommendations from the number of threads subsystem optimizer and the PLI subsystem optimizer and user-specified constraints and rules 324 to generate a gating-mixture recommendation. According to some aspects, user-specified constraints and rules may be related to system-level parameters of the HDL simulator such as processor thread numbers, PLI accesses parameters, processor thread options, simulator inlining parameters, simulator option checks, UVM features, FGP tuning parameters, and PLI learning parameters.

According to some aspects, the gating model used to combine the aggregate recommendations at 322 to determine an aggregate combination of parameters. According to some aspects, a gating-mixture recommendation can be generated by combining the aggregate recommendations. The set of weights used for weighted averaging can be generated by the gated model. According to some aspects, the gating model can aggregate recommendations from independent subsystems without weighted averaging.

At 326, the gating-mixture recommendation is applied to update a configuration of the HDL simulator and compiler. The updated configuration includes an optimized combination of parameters tuned to optimize the performance of the HDL simulator and compiler. For example, the present system provides the optimized combination of parameters (e.g., number of threads, PLI accesses) to update the configuration of the HDL simulator and compiler. At 328, the HDL simulator and compiler perform a simulation of a circuit design that is under test using the updated configuration. The simulation results are monitored to quantify the performance of the simulator and compiler. According to some aspects, the simulation results and the metadata generated during the simulation process are collected. According to some aspects, the collected simulation results and metadata are used during a learning phase as inputs to one or more optimization algorithms used by the subsystem optimizers.

Figure 4:
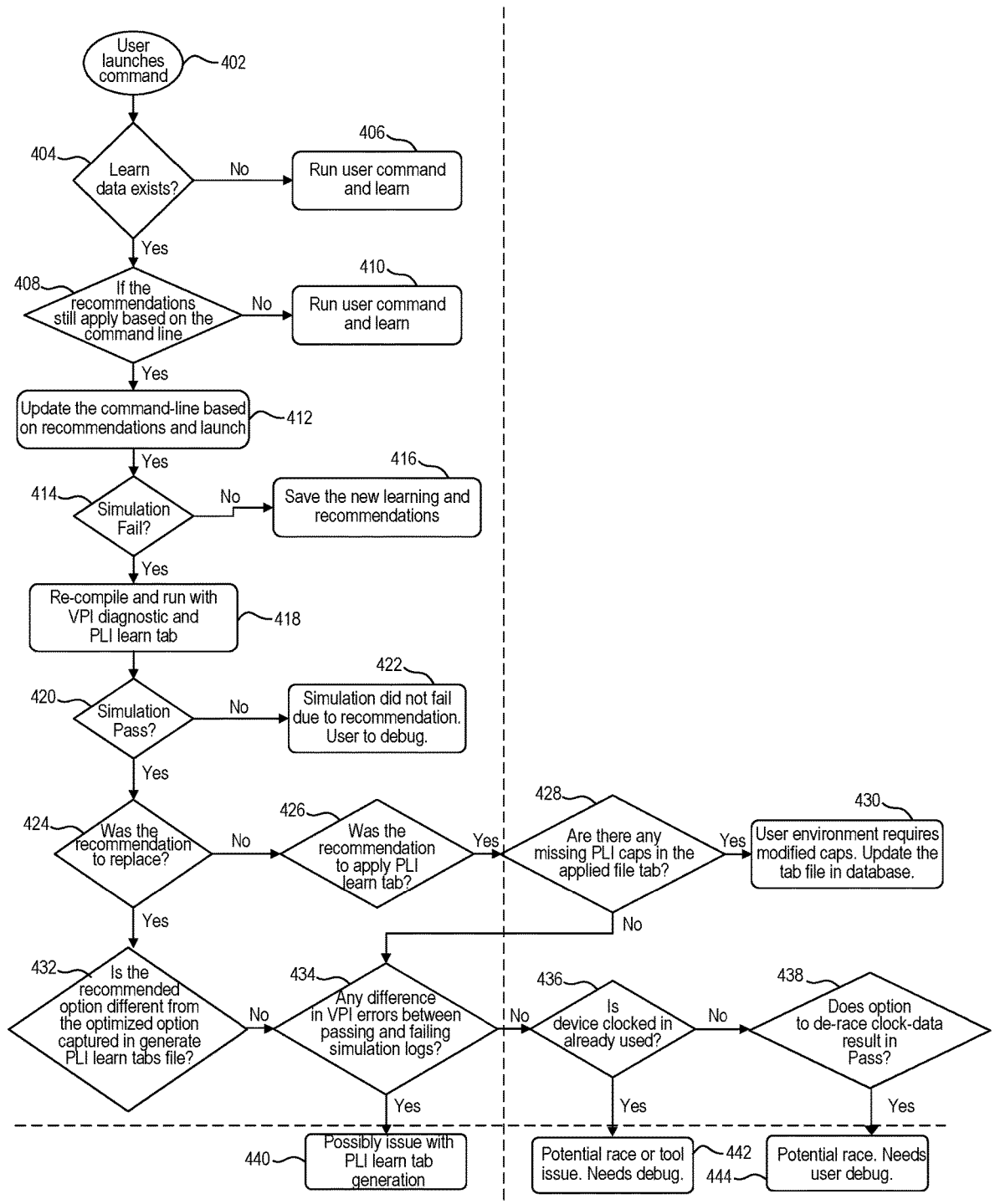
FIG. 4 illustrates an exemplary method for applying optimization recommendations generated by a Hardware Description Language (HDL) simulator dynamic runtime optimization module.

FIG. 4 illustrates an example method for applying optimization recommendations 108 generated by HDL simulator dynamic runtime optimization module 106, according to some aspects. According to some aspects, the method corresponds to a single system of the HDL simulator dynamic optimization module. According to some aspects, the method in FIG. 4 illustrates an example method for applying an optimized recommendation from 108 corresponding to PLI learn optimization. According to some aspects, the optimized recommendation is generated by the subsystem optimizer 312.

According to some aspects, at 402, a user launches a command to optimize HDL compiler performance. At 404, a determination is made whether data collected during a learning phase exists in the system. Collected data during the learning phase may include design verification data 102 and HDL simulator data 104. In response to a determination that collected data does not exist, at 406, a command to enter a learning phase to collect data is executed. According to some aspects, in response to a determination that data collected during a learning phase is available in the system, at 408, a determination is made whether corresponding recommendations are applicable based on the command line. The corresponding recommendations can be generated by HDL simulator dynamic runtime optimization module 106 using the collected learn data. At 410, in response to a determination that the corresponding recommendations are not applicable, a command to enter a learning phase to collect data is executed, similar to 406.

According to some aspects, in response to a determination that the generated recommendations still apply based on the command-line, at 412, command line arguments are updated based on the recommendations to generate an updated hardware configuration. A command is launched to run the HDL simulator to perform a simulation using the updated hardware configuration. At 414, a determination is made whether the simulation succeeded or failed. Based on a determination that the simulation did not fail, at 416, the learning data and the corresponding recommendations are saved by the system and used for future simulations.

At 418, in response to a determination that the simulation performed using the recommendations failed, the simulation is recompiled and run with the original user command, according to some aspects. Further, according to some aspects, the command line arguments may be updated by adding Verilog procedural interface (VPI) dialogue and PLI learning tabs of the PLI subsystem, as shown at 418. At 420, a determination is made whether the simulation that was recompiled with the diagnostic enabled. In response to a determination that the simulation at 418 failed, a determination is made that the simulation at 414 did not fail due to the generated recommendation and that there is likely some other user-generated cause of the simulation failure. The present system may provide a diagnostic indication to a user to debug to identify the cause of the simulation failure.

At 424, a determination is made whether the recommendation is to replace and/or debug. At 424, if it is determined that the recommendation is not to replace and/or debug, at 426, it is determined whether the command is associated with simulation to learn the recommendations. If it is determined that the command was for learning the recommendation, at 428, it may be further determined whether recommendations are generated properly. If it is determined that, at 428, the recommendations file is improper, the recommendations may be updated, as shown at 430. However, if it is determined that, at 428, the generated recommendation file has no error, at 434, the recommendation files are compared with the recommendation files for simulation pass, and simulation fails to identify any differences in the recommendation files. If there are differences in the recommendation files for simulation pass and simulation fail, at 440, it may be determined that there may be issues with machine learning data collection.

At 434, if it is determined that there is a difference in VPI errors with VPI diagnostic option between passing and failing simulation logs, at 436, it may be determined whether an option to de-race clock and date is already used. If it is determined that the option to de-race clock and data is already used, at 442, it may be determined that there may be a potential race condition or tool issue and needs further debugging by the user. At 436, if the device under test is not already used, at 438, it may be determined whether the device under test with the recommendation options results in the passing of the simulation. If it is determined at 438 that the simulation did not pass, the user may need to debug, as shown at 444. At 424, if it is determined that recommendation is to replace the design and/or debug, then at 432, a determination is made whether the recommended option is different from the optimized option captured in the generate PLI learn tabs of the HDL simulator.

Figure 5:
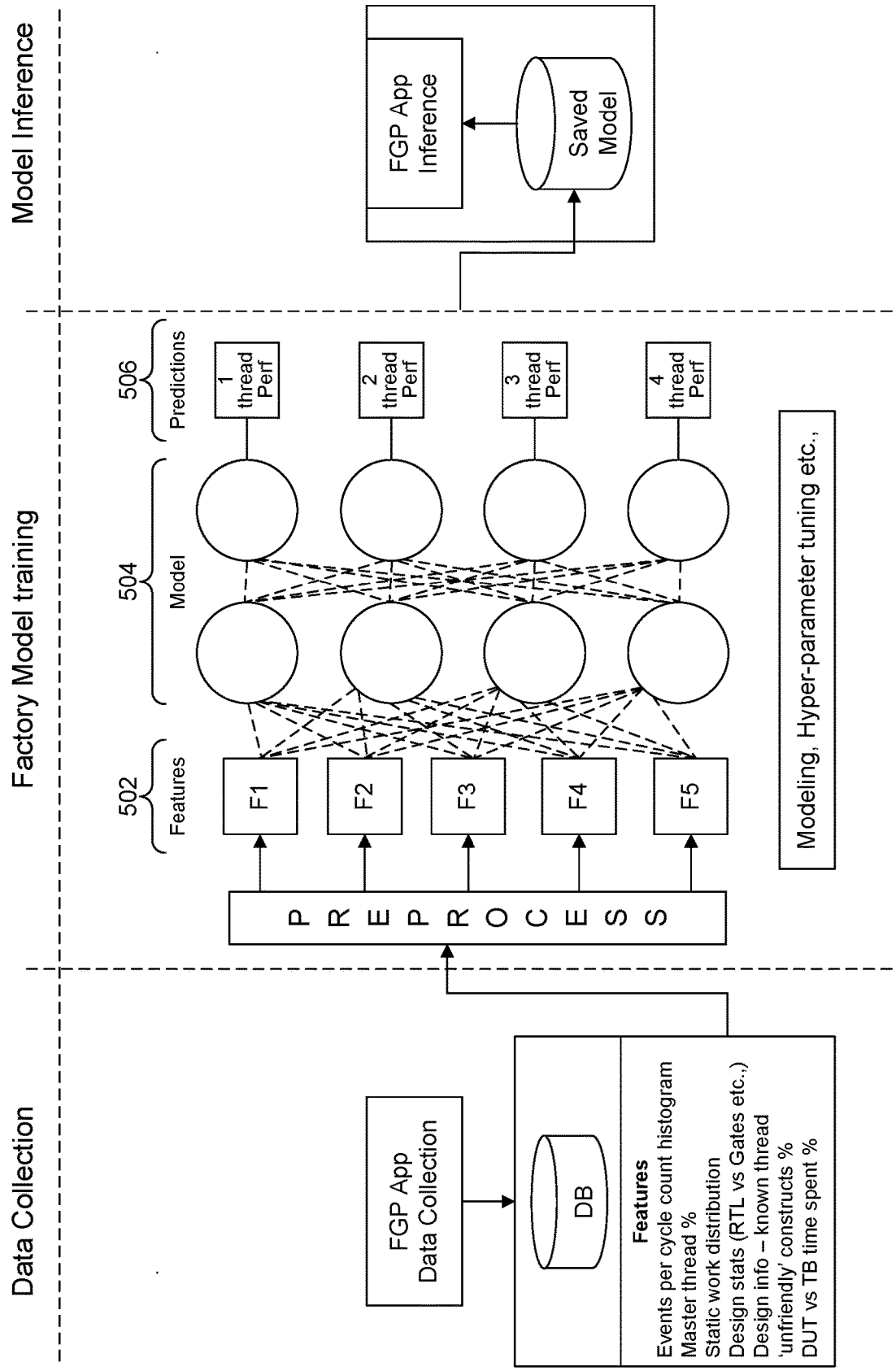
FIG. 5 illustrates an exemplary optimization application based on a factory-trained machine learning (ML) model.

FIG. 5 illustrates an exemplary optimization application of a single subsystem based on a factory-trained ML model, according to some aspects of the present disclosure. The ML model may predict the use of multi-cores or threads in a simulation based on the event activity counts and the amount of parallelization potential available in the simulation. According to some aspects, the ML model can be a factory-trained model, as shown in FIG. 5. According to some aspects, features 502 of the factory-trained model may include various parameters corresponding to a plurality of cores or threads of a system. The machine learning model 504 may analyze the one or more features 502 and may generate predictions 506 for the performance of each thread or core of the system.

According to some aspects, a profiling application of the HDL simulator performs data collection that is used for training the factory-trained model. According to some aspects, data collected for training the factory-trained model may include events per cycle histogram collected from simulation, a master thread percentage, various design statistics such as percentage of sequential blocks, combinations blocks, number of synchronous clocks, activity on each clock, design information such as known thread unfriendly constructs such as delays in simulation, and testbench and design time percentage values.

According to some aspects, the factory-trained model may be a rule-based model based on rules written by expert developers for optimization based on the data collected for training. According to some aspects, the factory-trained model may be an ML based model using the data collected from simulations performed by a factory benchmark HDL simulator. According to some aspects, the factory trained model may be a combination model based on averaged recommendations, a most conservative recommendation or a weighted combination based on confidence values.

According to some aspects, by way of a non-limiting example, an optimization application based on reinforcement-learning can be a design perform optimization (DPO) method that uses a certain number of trial runs to identify which performance tuning options may provide the best performance result for the design being compiled. According to some aspects, an application may provide infrastructure recommendations, such as a recommendation corresponding to a faster or cheaper hardware configuration. By way of a non-limiting example, an optimization application may be an application, which takes the overall regression history and recommends a configuration of compute and storage hardware and capabilities for the regression.

According to some aspects, the FGP application generates an inference regarding the aggregate recommendation for optimal number of processor threads and cores based on the output of the factory trained model. According to some aspects, recommendations generates by HDL simulator dynamic optimization module 106 may be applied to the HDL simulator automatically in subsequent compiles and simulations. According to some aspects, the recommendations may be applied automatically by default, or the user may explicitly state which specific recommendations may be applied. According to aspects, optimization applications may further provide a built-in capability to collect new data. The new data is typically used to further train the app to improve the AI-based agent's precision and recall for performance recommendations.

Figure 6:
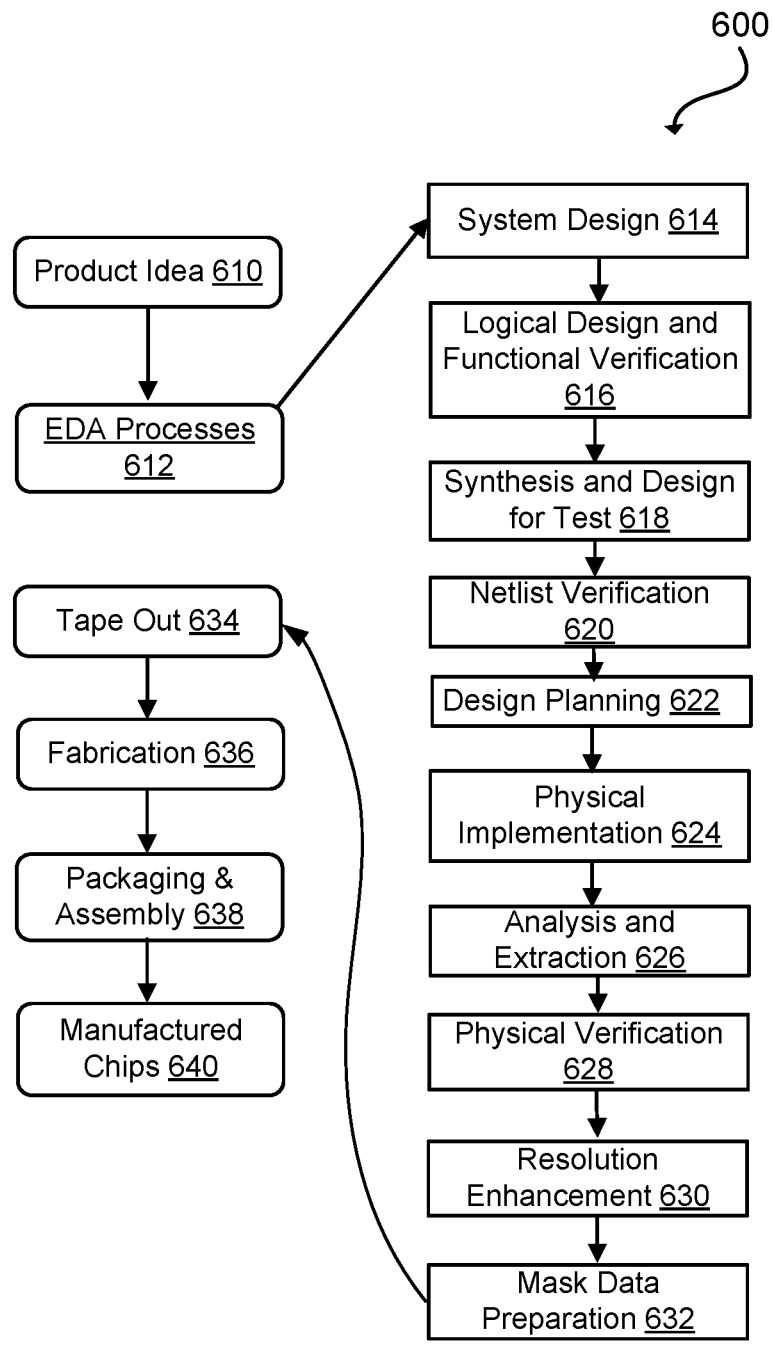
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification systems). A design process may use a sequence depicted in FIG. 6. The processes described by be enabled by EDA products (or systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 800 of FIG. 8, or host system 707 of FIG. 7) may be used to store the programs and data structures that are used by some or all of the EDA products described herein, and products used for development of cells for the library and for physical and logical design that use the library.

Figure 7:
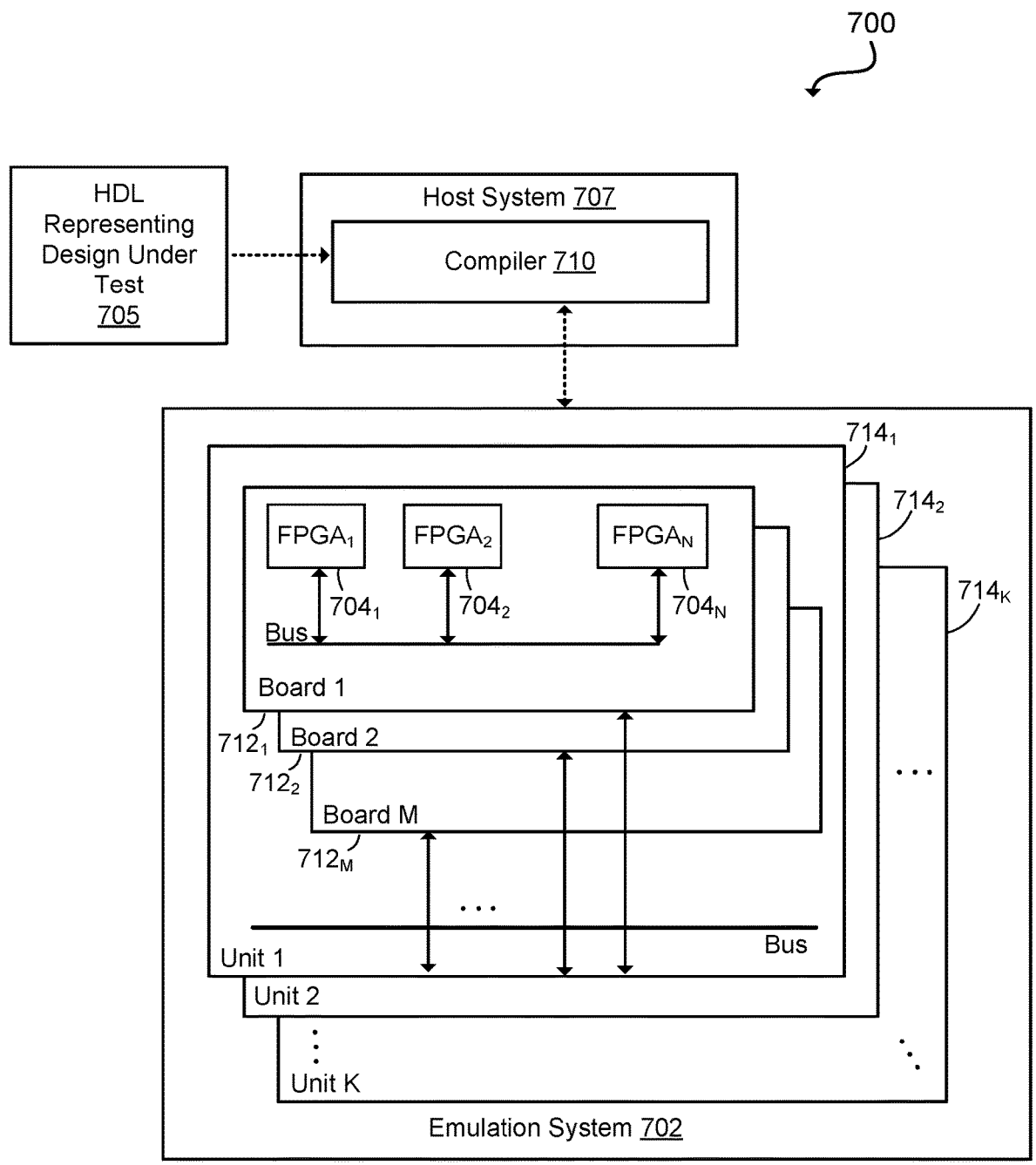
FIG. 7 depicts a diagram of an example emulation system in accordance with some embodiments of the present disclosure.

FIG. 7 depicts a diagram of an example emulation environment 700. An emulation environment 700 may be configured to verify the functionality of the circuit design. The emulation environment 700 may include a host system 707 (e.g., a computer that is part of an EDA system) and an emulation system 702 (e.g., a set of programmable devices such as Field Programmable Gate Arrays (FPGAs) or processors). The host system generates data and information by using a compiler 710 to structure the emulation system to emulate a circuit design. A circuit design to be emulated is also referred to as a Design Under Test ('DUT') where data and information from the emulation are used to verify the functionality of the DUT.

The host system 707 may include one or more processors. In the embodiment where the host system includes multiple processors, the functions described herein as being performed by the host system can be distributed among the multiple processors. The host system 707 may include a compiler 710 to transform specifications written in a description language that represents a DUT and to produce data (e.g., binary data) and information that is used to structure the emulation system 702 to emulate the DUT. The compiler 710 can transform, change, restructure, add new functions to, and/or control the timing of the DUT.

The host system 707 and emulation system 702 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 707 and emulation system 702 can exchange data and information through a third device such as a network server.

The emulation system 702 includes multiple FPGAs (or other modules) such as FPGAs $704_1$ and $704_2$ as well as additional FPGAs to $704_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 702 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $704_1$-$704_N$ may be placed onto one or more boards $712_1$ and $712_2$ as well as additional boards through $712_M$. Multiple boards can be placed into an emulation unit $714_1$. The boards within an emulation unit can be connected using the backplane of the emulation unit or any other types of connections. In addition, multiple emulation units (e.g., $714_1$ and $714_2$ through $714_K$) can be connected to each other by cables or any other means to form a multi-emulation unit system.

For a DUT that is to be emulated, the host system 707 transmits one or more bit files to the emulation system 702. The bit files may specify a description of the DUT and may further specify partitions of the DUT created by the host system 707 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 707 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 707 and/or the compiler 710 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 705 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
generating, by a first subsystem optimizer, a plurality of recommendations corresponding to a first subsystem of a hardware description language (HDL) simulation system, wherein the plurality of recommendations are generated by the first subsystem optimizer using one or more optimization applications;
generating, by the first subsystem optimizer, a first aggregate recommendation by combining the plurality of recommendations corresponding to the first subsystem of the HDL simulation system; and
updating a configuration of the first subsystem of the HDL simulation system based on the first aggregate recommendation, wherein the HDL simulation system is configured to simulate a circuit design using the updated configuration during execution of the first subsystem.

2. The method of claim 1, further comprising:
generating, by a second subsystem optimizer, a second aggregate recommendation by combining a plurality of recommendations corresponding to a second subsystem, wherein the plurality recommendations corresponding to the second subsystem are generated by the second subsystem optimizer using one or more optimization applications; and combining, using a gating model, the first aggregate recommendation, the second recommendation, and a user input to generate a gating-mixture recommendation, wherein updating the configuration of the first subsystem of the HDL simulation system comprises updating a configuration of the HDL simulation system based on the gating-mixture recommendation.

3. The method of claim 2, wherein the combining is performed by the gated model using a random forest machine learning process.

4. The method of claim 1, wherein an optimization application of the one or more optimization applications is based on a weak learner process.

5. The method of claim 1, wherein an optimization application of the one or more optimization applications is based on a machine learning process.

6. The method of claim 1, wherein an optimization application of the one or more optimization applications is based on a rule-based model.

7. The method of claim 1, wherein the one or more recommendations corresponding to the first subsystem are combined using a weighted averaging.

8. The method of claim 1, wherein the one or more recommendations are generated based on data related to one or more of test-bench constructs, design constructs, coverage constructs, assertion constructs, low power constructs, compile statistics, runtime statistics, switches, profiles, and simulator heuristics.

9. The method of claim 1 wherein the updated configuration comprises a specified set of computing resources for the HDL simulation system.

10. A system comprising:
a memory storing instructions; and
a processor, coupled with the memory and to execute the instructions, the instructions when executed cause the processor to:
generate a plurality of recommendations corresponding to a first subsystem of a hardware description language (HDL) simulation system using one or more optimization applications;
generate a first aggregate recommendation by combining the plurality of recommendations corresponding to the first subsystem of the HDL simulation system; and
update a configuration of the first subsystem of the HDL simulation system based on the first aggregate recommendation, wherein the HDL simulation system is configured to simulate a circuit design using the updated configuration during execution of the first subsystem.

11. The system of claim 10, wherein the instructions when executed further cause the processor to:
generate a second aggregate recommendation by combining a plurality of recommendations corresponding to a second subsystem, wherein the plurality of recommendations corresponding to the second subsystem are generated using one or more optimization applications; and
combine the first aggregate recommendation, the second recommendation, and a user input to generate a gating-mixture recommendation,
wherein updating the configuration of the first subsystem of the HDL simulation system comprises updating a configuration of the HDL simulation system based on the gating-mixture recommendation.

12. The system of claim 11, wherein the gated model uses a random forest machine learning process.

13. The system of claim 10, wherein an optimization application of the one or more optimization applications is based on a weak learner process.

14. The system of claim 10, wherein the one or more recommendations corresponding to the first subsystem are combined using a weighted averaging.

15. The system of claim 10 wherein the updated configuration comprises a specified set of computing resources for the HDL simulation system.

16. A non-transitory computer readable medium comprising stored instructions, which when executed by a processor, cause the processor to:
generate a plurality of recommendations corresponding to a first subsystem of a hardware description language (HDL) simulation system, wherein the plurality of recommendations are generated using one or more optimization applications;
generate a first aggregate recommendation by combining the plurality of recommendations corresponding to the first subsystem of the HDL simulation system; and
update a configuration of the first subsystem of the HDL simulation system based on the first aggregate recommendation, wherein the HDL simulation system is configured to simulate a circuit design using the updated configuration during execution of the first subsystem.

17. The non-transitory computer readable medium of claim 16, the instructions when executed by a processor, further cause the processor to:
generate a second aggregate recommendation by combining a plurality of recommendations corresponding to a second subsystem, wherein the plurality of recommendations corresponding to the second subsystem are generated using one or more optimization applications; and
combine the first aggregate recommendation, the second recommendation, and a user input to generate a gating-mixture recommendation,
wherein updating the configuration of the first subsystem of the HDL simulation system comprises updating a configuration of the HDL simulation system based on the gating-mixture recommendation.

18. The non-transitory computer readable medium of claim 17, wherein the gated model uses a random forest machine learning process.

19. The non-transitory computer readable medium of claim 16, wherein an optimization application of the one or more optimization applications is based on a weak learner process.

* * * * *

UNITED STATES PATENT AND TRADEMARK OFFICE
CERTIFICATE OF CORRECTION

| | | |
|---|---|---|
| PATENT NO. | : 11,636,244 B1 | Page 1 of 1 |
| APPLICATION NO. | : 17/490897 | |
| DATED | : April 25, 2023 | |
| INVENTOR(S) | : Badri Prasad Gopalan et al. | |

It is certified that error appears in the above-identified patent and that said Letters Patent is hereby corrected as shown below:

On the Title Page
Item (72) Inventors: Vamsi Krishna Doppalapudi, Line 5  Delete "Hyberabad" and
  Insert -- Hyderabad --

In the Claims
Column 20, Line 64, Claim 2  After "plurality" insert -- of --

Signed and Sealed this
Twenty-seventh Day of June, 2023

Katherine Kelly Vidal
*Director of the United States Patent and Trademark Office*